(12) United States Patent
Thompson et al.

(10) Patent No.: US 7,856,303 B2
(45) Date of Patent: Dec. 21, 2010

(54) METHOD OF DETERMINING WHEEL SLIPPAGE AND ENGAGING A DIFFERENTIAL LOCK IN A WORK VEHICLE

(75) Inventors: Isaac W. Thompson, Dubuque, IA (US); Eric Anderson, Galena, IL (US); Michael R. Gratton, Dubuque, IA (US)

(73) Assignee: Deere & Company, Moline, IL (US)

( * ) Notice: Subject to any disclaimer, the term of this patent is extended or adjusted under 35 U.S.C. 154(b) by 972 days.

(21) Appl. No.: 11/678,118

(22) Filed: Feb. 23, 2007

(65) Prior Publication Data

US 2008/0208428 A1 Aug. 28, 2008

(51) Int. Cl.
*B60T 8/00* (2006.01)
(52) U.S. Cl. .......................... 701/50; 701/82
(58) Field of Classification Search .................. 701/36, 701/50, 82, 83, 84, 70, 79; 180/197
See application file for complete search history.

(56) References Cited

U.S. PATENT DOCUMENTS

| | | | | |
|---|---|---|---|---|
| 5,574,643 A | | 11/1996 | Yesel | 364/426.02 |
| 5,869,943 A | * | 2/1999 | Nakashima et al. | 318/586 |
| 6,148,260 A | * | 11/2000 | Musk et al. | 701/200 |
| 6,600,979 B1 | * | 7/2003 | Kumar et al. | 701/20 |
| 6,885,930 B2 | * | 4/2005 | Wang | 701/70 |
| 2004/0176898 A1 | | 9/2004 | Belvo et al. | |

FOREIGN PATENT DOCUMENTS

| | | |
|---|---|---|
| EP | 0 457 743 A1 | 11/1991 |
| EP | 0 500 403 | 8/1992 |
| EP | 1 090 799 A2 | 4/2001 |

* cited by examiner

*Primary Examiner*—Richard M. Camby
(74) *Attorney, Agent, or Firm*—Taylor IP

(57) ABSTRACT

A method of determining wheel slippage in a work vehicle includes the steps of: sensing an absolute ground speed of the work vehicle; calculating a ground speed of the work vehicle using at least one drive train component; comparing the absolute ground speed with the calculated ground speed; generating a scaling factor based upon the comparison; and adjusting the calculated ground speed using the scaling factor. The method may also include the steps of scaling the absolute ground speed to a threshold value; comparing the calculated ground speed with the threshold value; and engaging a differential lock if the calculated ground speed is greater than the threshold value.

19 Claims, 4 Drawing Sheets

METHOD OF DETERMINING WHEEL SLIPPAGE AND ENGAGING A DIFFERENTIAL LOCK IN A WORK VEHICLE

FIELD OF THE INVENTION

The present invention relates to work vehicles, and, more particularly, to methods of determining wheel slippage and engaging a differential lock in a work vehicle.

BACKGROUND OF THE INVENTION

Work vehicles, such as agricultural, construction or forestry work vehicles, typically include an internal combustion engine which drives a transmission, which in turn drives at least one axle through a differential lock. In the event that traction is lost and a wheel begins to slip, all power is applied to the slipping wheel through the differential and the opposite wheel receives little or no torque. In the case of a rear wheel drive work vehicle, an operator can typically lock the rear wheels together by operating a foot or hand lever to engage the differential lock. By engaging the differential lock, the wheels spin at the same speed and the wheel that is not spinning can be used to regain traction.

The assignee of the present invention, John Deere, also manufactures and sells a front wheel assist work vehicle used primarily in the construction and agricultural markets (also known as a mechanical front wheel drive, or MFWD). With an MFWD, the front wheels are typically locked together through a differential using an electric switch on the floor.

Certain types of work vehicles, such as front end loaders, may be used to push earth or the like, resulting in a load which could cause wheel slippage. Another example is an agricultural tractor pulling a pull-type implement through wet soil, in which event the drive wheels could also slip. Under such conditions, it may be desirable to automatically engage the differential lock of the rear and/or front differentials without operator intervention, thereby allowing the operator to focus on the work operation at hand.

What is needed in the art is a method of automatically engaging a differential lock in a work vehicle upon accurate detection of wheel slippage of one or more axles.

SUMMARY OF THE INVENTION

The invention in one form is directed to a method of determining wheel slippage in a work vehicle, including the steps of: sensing an absolute ground speed of the work vehicle; calculating a ground speed of the work vehicle using at least one drive train component; comparing the absolute ground speed with the calculated ground speed; generating a scaling factor based upon the comparison; and adjusting the calculated ground speed using the scaling factor.

The invention in another form is directed to a method of determining wheel slippage in a work vehicle, including the steps of: sensing an absolute ground speed of the work vehicle; calculating a ground speed of the work vehicle using at least one drive train component; scaling the absolute ground speed to a threshold value; comparing the calculated ground speed with the threshold value; and engaging a differential lock if the calculated ground speed is greater than the threshold value.

DETAILED DESCRIPTION OF THE INVENTION

Figure 1:
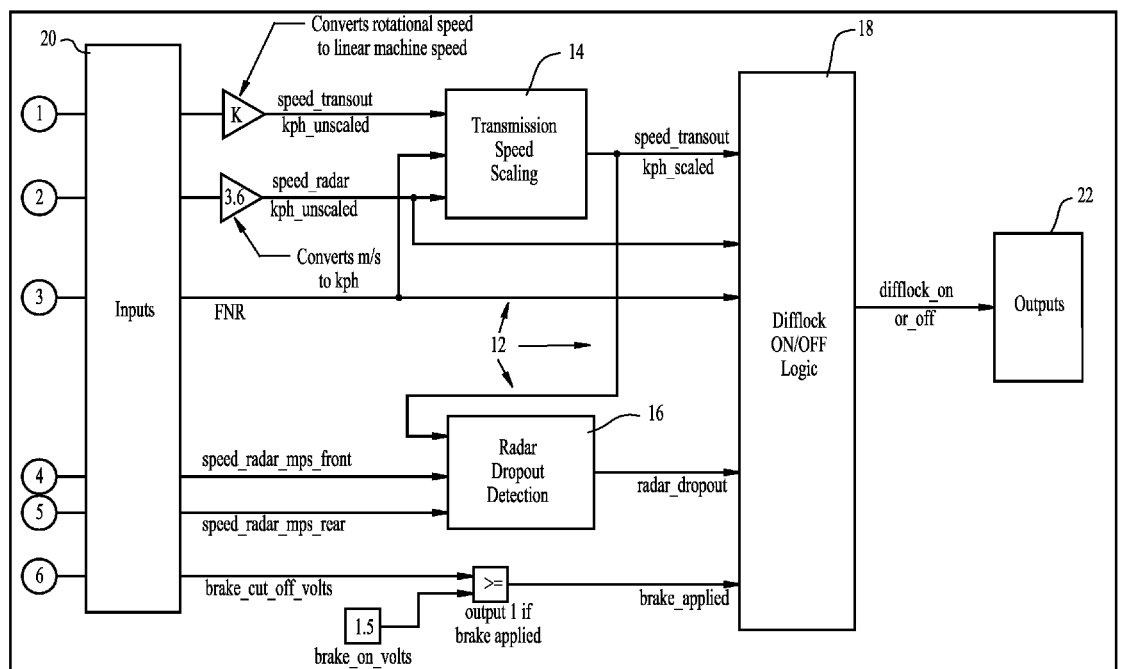
FIG. 1 is a schematic system level view of a work machine configured for carrying out an embodiment of the method of the present invention for sensing wheel slippage and automatically engaging a differential lock.

Referring now to the drawings, and more particularly to FIG. 1, there is shown a schematic system level view of a work vehicle 10 which is configured for carrying out an embodiment of the method of the present invention for sensing wheel slippage and automatically engaging a differential lock (also referred to as "difflock" herein). Work vehicle 10 could be a construction vehicle, agricultural vehicle or other type of work vehicle.

FIG. 1 generally corresponds to the inputs, control logic and outputs for an electronic control unit (ECU) 12 onboard work vehicle 10. As shown, ECU 12 generally includes control logic for carrying out transmission speed scaling (box 14), radar dropout detection (box 16), and difflock on/off logic (box 18). Inputs to ECU 12 are shown in box 20, and outputs are shown in box 22. The various inputs shown in box 20 and the radar dropout detection shown in box 16 will be described in more detail below with regard to FIG. 2. The transmission speed scaling shown in block 14 will be described in more detail below with regard to FIG. 3. The difflock on/off logic shown in box 18 will be described in more detail below with regard to FIG. 4.

Figure 2:
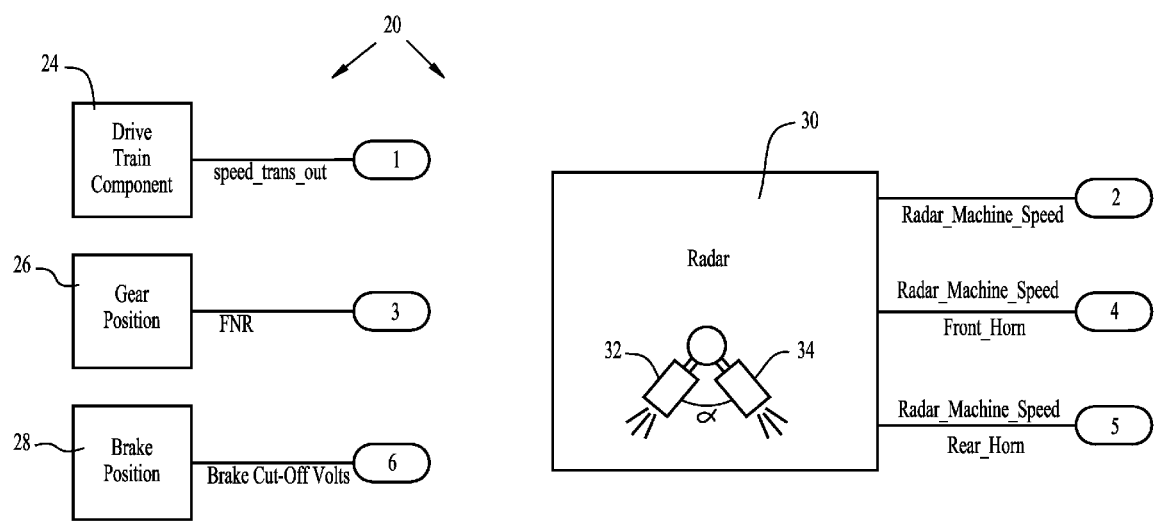
FIG. 2 is a schematic illustration of various inputs used in the method of the present invention.

Referring now to FIG. 2, there is shown a schematic illustration of the various inputs used in the method of the present invention illustrated in FIG. 1. A drive train component 24 provides an output signal "speed_trans_out" which is used to calculate a ground speed of work vehicle 10 by ECU 12. In the embodiment shown, drive train component 24 is preferably in the form of a transmission output shaft and corresponding sensor providing the transmission speed output signal.

The box labeled gear position 26 is a sensor providing a sensor output signal with an indication of whether a gear shift lever in an operators cab is in a forward, neutral or reverse position. The differential lock may only be automatically engaged when the gear shift lever is in the forward or reverse positions, and thus this signal provides an input to the boolean logic in determining whether the difflock may be engaged.

The box labeled brake pedal position 28 provides an output signal indicating whether the service brakes of work vehicle 10 have been engaged. The difflock is not automatically engaged if the brake pedal has been depressed.

The box labeled radar 30 corresponds to a radar which is used to sense an absolute ground speed of work vehicle 10. As shown within box 30, the radar includes a front horn 32 and a rear horn 34 positioned at an angle $\alpha$ therebetween (e.g., 90°), which are positioned to reflect radar signals at an angle off of the ground surface. Front horn 32 is positioned at a forward angle relative to the direction of travel of work vehicle 10, and provides an output signal "radar_machine_speed_front_horn" corresponding to the absolute ground speed sensed by front horn 32. Similarly, rear horn 34 is positioned at a rearward angle relative to the direction of travel of work vehicle 10, and provides an output signal "radar_machine_speed_rear_horn" corresponding to the absolute ground speed of work vehicle 10 sensed by rear horn 34. The radar unit also provides a composite output signal labeled "radar_machine_speed".

Figure 3:
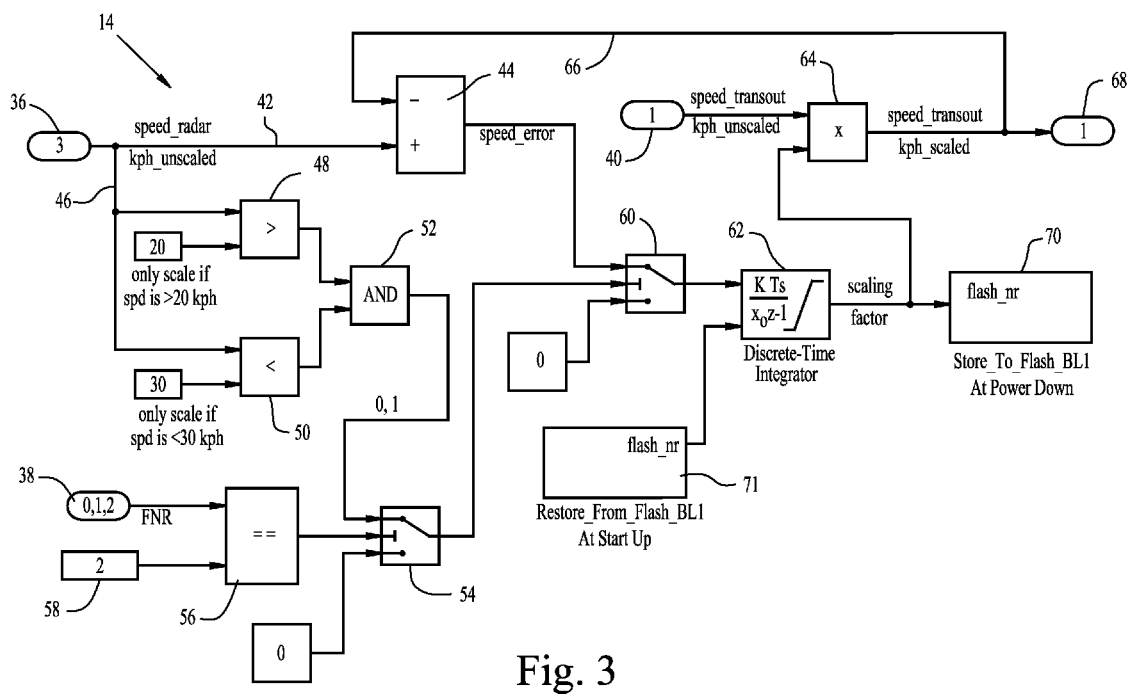
FIG. 3 is a schematic illustration of a portion of the logic of the method of the present invention.

Referring now to FIG. 3, the transmission speed scaling shown at box 14 in FIG. 1 will be described in greater detail. There are three primary inputs to this control logic, indicated at inputs 36, 38 and 40. Input signal 36 is the unscaled absolute ground speed of work vehicle 10 which is sensed using the radar (composite radar signal), converted to appropriate units as shown in FIG. 1. Input 36 is transmitted via line 42 to box 44 for speed error correction, and is also transmitted via line 46 to boolean operators making sure that certain operating conditions exist. Boolean operators at boxes 48, 50 and 52 ensure that scaling of the radar signal only occurs if the ground speed of work vehicle 10 is greater than 20 kilometers per hour and less than 30 kilometers per hour. The output from box 52 is a yes (1) or no (0) which is transmitted as an input to boolean operator 54.

Input 38 is a signal value indicating whether the gear shift is in the forward, neutral or reverse position, and is received from gear position 26 in FIG. 2. In the example shown, input 38 has a value of 0, 1 or 2 with the value 2 indicating that the gear shift is in the forward position. The value of the input signal is compared at boolean operator 56 with a constant value from box 58 (i.e., in this case, the value 2) and an output signal is provided to boolean operator 54. In the example shown, the output signal from boolean operator 56 is true (1) if the gear shift lever is determined to be in a forward position, and false (0) if not.

Boolean operator 54 is basically a switch which passes the value of the top line or the bottom line, depending upon the value of the signal from boolean operator 56. If the gear shift lever is not in a forward position, then a false (0) value is passed through boolean operator 54. On the other hand, if the gear shift lever is determined to be in a forward position, then the value of the top line is passed through boolean operator 54, in this instance a true (1) or false (0) representing whether scaling is to take place dependent upon the operating speed of work vehicle 10. It will thus be apparent that an output signal of one from boolean operator 54 only occurs if the gear shift lever is in the forward position and the sensed operating speed is within a particular range.

Boolean operator 60 receives the output signal from boolean operator 54. If the signal value is high (i.e., a value of 1) then boolean operator 60 basically acts as a switch to pass through the value of the top line corresponding to a corrected speed error signal. Otherwise, boolean operator 60 passes through a false (0) value from the bottom line. In the event the top line is passed through, the value is a difference between a sensed absolute ground speed of work vehicle 10 and a scaled, calculated ground speed of work vehicle 10, as will be described in more detail hereinafter.

The output signal from boolean operator 60 is passed to an integrator 62, and desirably is a small number indicating a small difference between the sensed and calculated ground speeds. Such errors between the sensed and calculated ground speeds can result, e.g., because of differing tire diameters caused by inflation pressures within tires, tread wear on tires, loading on work vehicle 10, etc. In the embodiment shown, integrator 62 integrates the speed error signal over a specified time period (e.g., approximately 10 minutes) and can be used to detect an abrupt change in the error signal over time.

Integrator 62 provides an output signal in the form of a scaling factor which is transmitted to box 64. The scaling factor is used as an adjustment to the calculated ground speed represented by input signal 40, converted to appropriate units as shown in FIG. 1. The adjusted, calculated ground speed is fed back via line 66 in a closed loop fashion to an input of box 44. This continual closed loop correction between the sensed and calculated ground speeds using the scaling factor from integrator 62 should result in the scaled, calculated ground speed being closer over time to the sensed ground speed at the input to box 44, thus resulting in a smaller speed error correction output from box 44 over time. The output signal over time at output 68 thus should be close to the sensed ground speed of work vehicle 10.

At shutdown of work vehicle 10, the scaling factor from integrator 62 is stored to a flash memory as indicated by box 70, and is restored as indicated by box 71 as in input to integrator 62 at machine startup.

As shown in FIG. 1, the scaled, calculated ground speed is transmitted to difflock on/off logic 18, and also is transmitted as an input to radar dropout detection logic 16. Input signals to radar dropout detection 16 are also received from front horn 32 and rear horn 34 of the radar unit (FIG. 2). Generally, radar dropout detection 16 is used to detect a signal dropout resulting from radar transmission onto a highly reflective ground surface such as water. For example, as the work vehicle 10 moves across an area of standing water, the front horn 32 would first experience a signal dropout while the rear horn 34 would continue to provide a signal while moving into the water and then also lose signal when transmitting onto the water. If the scaled, calculated ground speed input signal to radar dropout detection 16 indicates that the wheels are still turning, while one or both of the radar horns have experienced signal dropout, then an output signal is provided from radar dropout detection 16 indicating such to difflock on/off logic 18.

Figure 4:
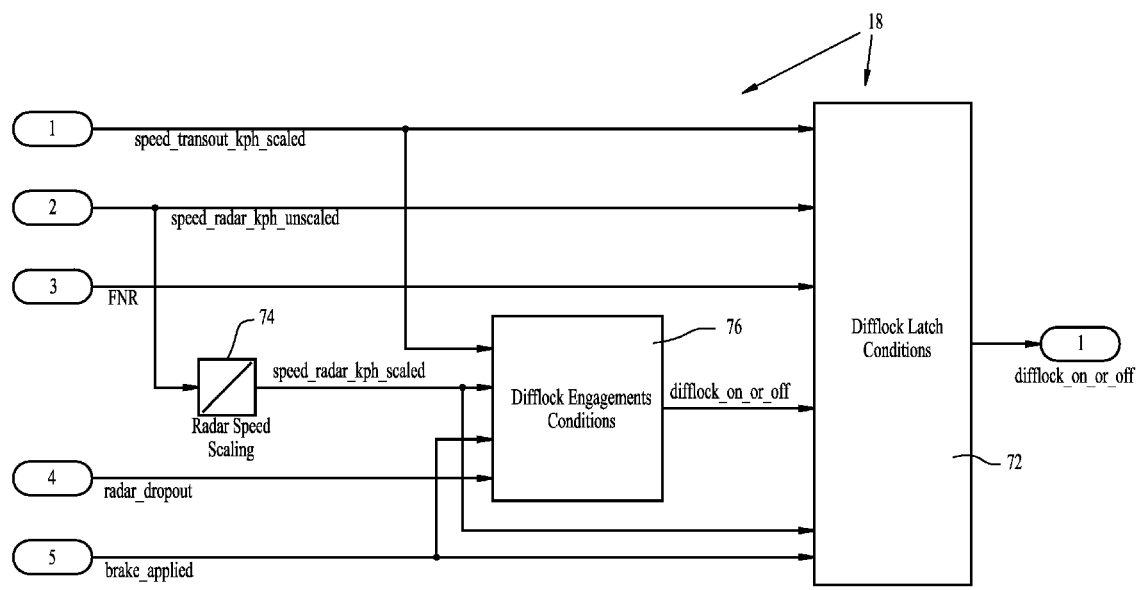
FIG. 4 is a schematic illustration of another portion of the logic of the method of the present invention.

Referring now to FIG. 4, the difflock on/off logic 18 will be described in greater detail. The unscaled, composite radar signal indicating the absolute ground speed of work machine 10 is transmitted as an input for difflock latch conditions 72 and radar speed scaling 74. Radar speed scaling 74 generally is in the form of a memory with a lookup table correlating the unscaled radar ground speed of work vehicle 10 with a corresponding threshold value at which the differential lock is to be automatically engaged. In other words, for a given sensed absolute ground speed using a radar, a corresponding threshold value is compared against a scaled, calculated ground speed. If the scaled, calculated ground speed is higher than the threshold value, then the difflock is automatically engaged. The scaling of the speed radar signal to the corresponding threshold value is shown as an approximate linear relationship in FIG. 4. However, it is to be understood that the scaling of the speed radar signal to a corresponding threshold value need not necessarily be a linear relationship across the range of input speed radar signals. The output from speed radar scaling 74 thus corresponds to a threshold value at which the differential lock is automatically engaged.

A block 76 labeled difflock engagement conditions is used to determine whether to automatically engage the difflock. If the scaled, calculated ground speed is less than a maximum value (i.e., 12 kph) and higher than the scaled radar signal (i.e., threshold value), and the brake is not applied, and radar dropout has not been detected, then the difflock engagement conditions are true (1) and a corresponding signal is output to difflock latch conditions 72. The various latch conditions for automatically engaging the difflock are shown in difflock latch conditions block 72.

Having described the preferred embodiment, it will become apparent that various modifications can be made without departing from the scope of the invention as defined in the accompanying claims.

The invention claimed is:

1. A method of determining wheel slippage in a work vehicle, comprising the steps of:

sensing an absolute ground speed of the work vehicle;

calculating a ground speed of the work vehicle using at least one drive train component;

comparing said absolute ground speed with said calculated ground speed;

generating a scaling factor based upon said comparison; and adjusting said calculated ground speed using said scaling factor.

2. The method of determining wheel slippage in a work vehicle of claim 1, including the step of feeding back said adjusted calculated ground speed to said comparing step in a closed loop fashion.

3. The method of determining wheel slippage in a work vehicle of claim 1, wherein said comparing step results in a speed error signal, and said generating step is carried out by integrating said speed error signal over time to generate said scaling factor.

4. The method of determining wheel slippage in a work vehicle of claim 3, wherein said integration can be used to detect an abrupt change in said error signal over time.

5. The method of determining wheel slippage in a work vehicle of claim 1, including the step of outputting a scaled calculated ground speed based upon said adjusted calculated ground speed.

6. The method of determining wheel slippage in a work vehicle of claim 1, wherein said calculating step comprises calculating a ground speed of the work vehicle using a transmission output speed.

7. The method of determining wheel slippage in a work vehicle of claim 1, wherein said absolute ground speed is sensed using a radar.

8. The method of determining wheel slippage in a work vehicle of claim 1, including the step of scaling said absolute ground speed to a threshold value at which a differential lock is engaged.

9. The method of determining wheel slippage in a work vehicle of claim 8, including the step of comparing said scaled absolute ground speed with said scaled calculated ground speed.

10. The method of determining wheel slippage in a work vehicle of claim 9, including the step of engaging a differential lock if said scaled calculated ground speed is greater than said scaled absolute ground speed.

11. The method of determining wheel slippage in a work vehicle of claim 10, wherein said absolute ground speed is sensed using a radar, and including the step of not engaging said differential lock if said radar has a signal fallout from a reflective ground surface.

12. The method of determining wheel slippage in a work vehicle of claim 11, wherein said radar has two sensing horns, and said signal fallout is determined when one said sensing horn ceases providing an output while an other said sensing horn continues providing an output.

13. A method of determining wheel slippage in a work vehicle, comprising the steps of:

sensing an absolute ground speed of the work vehicle;

calculating a ground speed of the work vehicle using at least one drive train component;

scaling said absolute ground speed to a threshold value;

comparing said calculated ground speed with said threshold value; and engaging a differential lock if said calculated ground speed is greater than said threshold value.

14. The method of determining wheel slippage in a work vehicle of claim 13, wherein said absolute ground speed is sensed using a radar.

15. The method of determining wheel slippage in a work vehicle of claim 13, wherein said threshold value comprises one of a plurality of threshold values stored in a memory, each said threshold value corresponding to a different said sensed absolute ground speed of the work vehicle.

16. The method of determining wheel slippage in a work vehicle of claim 15, wherein said memory includes a lookup table with said plurality of threshold values.

17. The method of determining wheel slippage in a work vehicle of claim 13, wherein said absolute ground speed is sensed using a radar, and including the step of not engaging said differential lock if said radar has a signal fallout from a reflective ground surface.

18. The method of determining wheel slippage in a work vehicle of claim 17, wherein said radar has two sensing horns, and said signal fallout is determined when one said sensing horn ceases providing an output while an other said sensing horn continues providing an output.

19. The method of determining wheel slippage in a work vehicle of claim 13, wherein said calculating step comprises calculating a ground speed of the work vehicle using a transmission output speed.

* * * * *